(12) United States Patent
Nomura et al.

(10) Patent No.: US 10,918,936 B2
(45) Date of Patent: Feb. 16, 2021

(54) TERMINAL APPARATUS, INFORMATION PROCESSING APPARATUS, AND MICROPHONE VOICE TRANSMISSION METHOD

(71) Applicant: SONY INTERACTIVE ENTERTAINMENT INC., Tokyo (JP)

(72) Inventors: Masanori Nomura, Tokyo (JP); Shigetaka Kudo, Tokyo (JP); Rui Yamada, Kanagawa (JP); Takashi Fujita, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/473,857

(22) PCT Filed: Jan. 4, 2018

(86) PCT No.: PCT/JP2018/000032
§ 371 (c)(1),
(2) Date: Jun. 26, 2019

(87) PCT Pub. No.: WO2018/131528
PCT Pub. Date: Jul. 19, 2018

(65) Prior Publication Data
US 2019/0321720 A1    Oct. 24, 2019

(30) Foreign Application Priority Data
Jan. 11, 2017 (JP) .............................. JP2017-002912

(51) Int. Cl.
*A63F 13/215* (2014.01)
*A63F 13/533* (2014.01)
(Continued)

(52) U.S. Cl.
CPC .......... *A63F 13/215* (2014.09); *A63F 13/533* (2014.09); *A63F 13/87* (2014.09);
(Continued)

(58) Field of Classification Search
USPC ....................................................... 463/37, 31
See application file for complete search history.

(56) References Cited

U.S. PATENT DOCUMENTS

2007/0293315 A1* 12/2007 Mizuta ................... A63F 13/10
463/36
2008/0119290 A1* 5/2008 Lee .......................... A63F 13/87
463/47
(Continued)

FOREIGN PATENT DOCUMENTS

JP    2005-100420 A    4/2005
JP    2005-284345 A    10/2005
(Continued)

OTHER PUBLICATIONS

International Preliminary Report on Patentability dated Jul. 25, 2019, from International Application No. PCT/JP2018/000032, 14 sheets.
(Continued)

*Primary Examiner* — Pierre E Elisca
(74) *Attorney, Agent, or Firm* — Katten Muchin Rosenman LLP

(57) ABSTRACT

A transmission processing section 206 transmits information regarding an operation performed by a user to an information processing apparatus 10. An image acquisition section 208 acquires image data of a game that reflects the operation information from the information processing apparatus 10. A voice acquisition section 210 acquires voice data of the game. A reproduction processing section 212 reproduces the acquired game image data and game voice data. A micro-
(Continued)

phone voice control section 202 controls whether or not to transmit a voice signal of a microphone 204 to the information processing apparatus 10. A display processing section 214 displays a microphone icon indicating status of the microphone 204.

9 Claims, 9 Drawing Sheets

(51) Int. Cl.
    *A63F 13/87*     (2014.01)
    *G06F 3/0481*     (2013.01)
    *G06F 3/16*     (2006.01)
    *A63F 13/30*     (2014.01)

(52) U.S. Cl.
    CPC .......... *G06F 3/04817* (2013.01); *G06F 3/165* (2013.01); *G06F 3/167* (2013.01); *A63F 13/30* (2014.09); *A63F 2300/1081* (2013.01); *A63F 2300/308* (2013.01); *A63F 2300/572* (2013.01)

(56) References Cited

U.S. PATENT DOCUMENTS

| | | | | |
|---|---|---|---|---|
| 2009/0203439 A1* | 8/2009 | Okada | ................ | G07F 17/3211 463/31 |
| 2009/0209326 A1* | 8/2009 | Okada | ................ | G07F 17/3211 463/25 |
| 2009/0227353 A1* | 9/2009 | Yoshizawa | .......... | G07F 17/3267 463/20 |
| 2014/0002464 A1* | 1/2014 | Furukawa | ............... | G06T 13/80 345/474 |
| 2019/0373020 A1* | 12/2019 | Belikovetsky | .... | H04W 12/1208 |

FOREIGN PATENT DOCUMENTS

| | | |
|---|---|---|
| JP | 2006-247381 A | 9/2006 |
| JP | 2014-081727 A | 5/2014 |
| JP | 2016-19756 A | 2/2016 |
| JP | 2016-46538 A | 4/2016 |
| WO | 2013/111247 | 8/2013 |
| WO | 2015/057160 A1 | 4/2015 |

OTHER PUBLICATIONS

International Search Report and Written Opinion dated Mar. 27, 2018, from International Application No. PCT/JP2018/000032, 9 sheets.

1st edition, Media Factory Kanushiki Kaisha Oct. 16, 2008, p. 102, ISBN: 978-4-8401-2462-1, non-official translation (Studio survive, "culdcept DS official guide [card & tactics]"), 4 sheets.

Decision to Grant a Patent dated Oct. 6, 2020, from JP Patent Application No. 2017-002912, 3 sheets.

* cited by examiner

FIG. 9
(a)
(b)
(c)
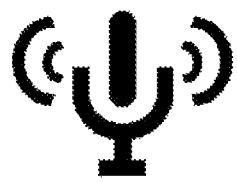

TERMINAL APPARATUS, INFORMATION PROCESSING APPARATUS, AND MICROPHONE VOICE TRANSMISSION METHOD

TECHNICAL FIELD

The present invention relates to techniques for executing a game by use of a remotely located information processing apparatus.

BACKGROUND ART

Recent years have seen the widespread use of services that allow users to share game images coming from the ongoing game or captured of games via a sharing site. It has also become possible for users to play the game together by having their terminals connected with one another on a peer-to-peer basis (P2P). PTL 1 discloses two modes of game play: "multi-play" in which multiple users having the same game play it together online, and "remote play" in which game operation information is transmitted to a remotely located information processing apparatus that in turn returns game images having the operation information reflected in the game progress.

CITATION LIST

Patent Literature

[PTL 1]
WO 2013/111247

SUMMARY

Technical Problem

When multiple players play games together, they can expand the scope of game play by communicating with each other via voice using voice applications such as voice chat. Thus it has been desired to build a scheme for sending the user's voice to each other during game play.

An object of the present invention is to provide techniques for transmitting a voice signal input to a microphone of a terminal apparatus to an information processing apparatus.

Solution to Problem

In solving the above problem and according to one embodiment of the present invention, there is provided a terminal apparatus including: a transmission processing section configured to transmit information regarding an operation performed by a user to an information processing apparatus; an acquisition section configured to acquire image data and voice data of a game that reflects the operation information from the information processing apparatus; a reproduction processing section configured to reproduce the acquired game image data and game voice data; and a microphone voice control section configured to control whether or not to transmit a voice signal of a microphone to the information processing apparatus.

According to another embodiment of the present invention, there is provided an information processing apparatus. The information processing apparatus includes: an execution section configured to generate image data and voice data of a game that reflects information regarding an operation performed by a user, the operation information being transmitted from a terminal apparatus; a transmission processing section configured to transmit the game image data and the game voice data to the terminal apparatus; a microphone voice acquisition section; and a microphone resource allocation section configured to allocate the microphone voice acquisition section to a microphone of the terminal apparatus.

According to a further embodiment of the present invention, there is provided a microphone voice transmission method. This method includes the steps of: transmitting information regarding an operation performed by a user to an information processing apparatus that executes a game; acquiring image data and voice data of the game that reflects the operation information from the information processing apparatus; reproducing the acquired game image data and game voice data; and controlling whether or not to transmit a voice signal of a microphone to the information processing apparatus.

Incidentally, if other combinations of the above-outlined composing elements or the above expressions of the present invention are converted between different forms such as a method, a device, a system, a recording medium, and a computer program, they still constitute effective embodiments of this invention.

BRIEF DESCRIPTION OF DRAWINGS

FIG. 9 is a schematic diagram depicting display examples of microphone icons.

DESCRIPTION OF EMBODIMENTS

Figure 1:
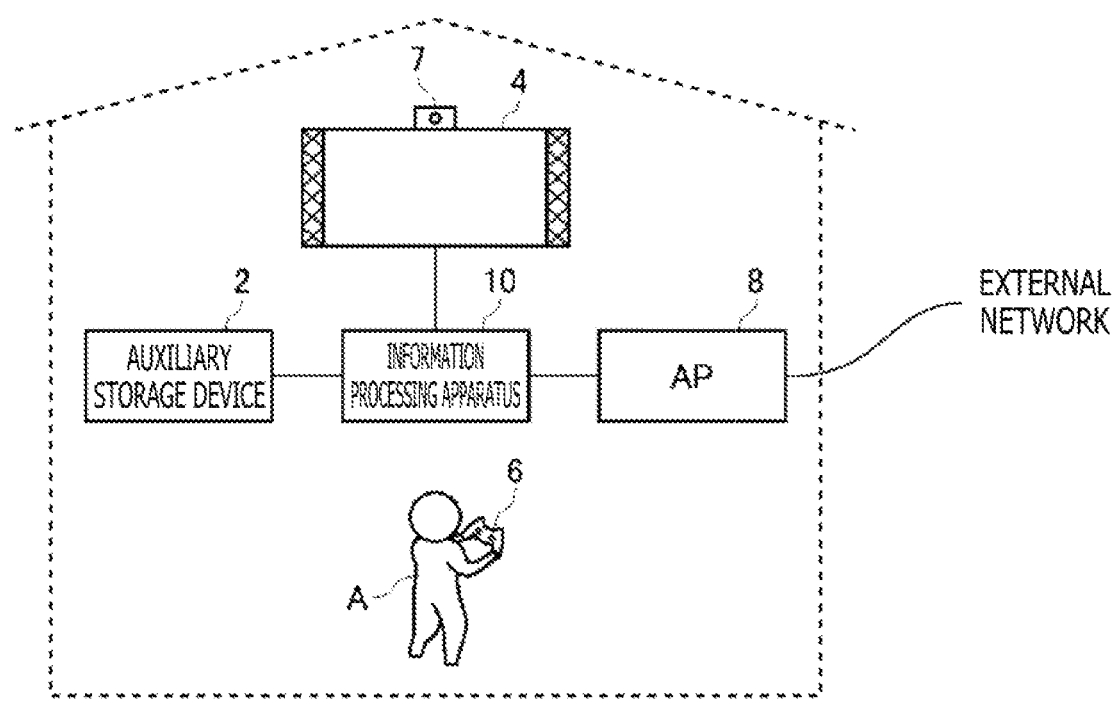
FIG. 1 is a schematic diagram depicting a basic mode of use of an information processing apparatus embodying the present invention.

FIG. 1 depicts a basic mode of use of an information processing apparatus 10 embodying the present invention. The information processing apparatus 10 is connected by wire or wirelessly with an input device 6 operated by a user A. The input device 6 supplies the information processing apparatus 10 with operation information indicating input operations performed by the user A. Upon receipt of the operation information from the input device 6, the information processing apparatus 10 has the received information reflected in the processing of system software and application software and causes an output device 4 to output the result of the processing. The information processing apparatus 10 of this embodiment is a game device that executes games. The input device 6 may be a game controller, for example, which supplies the information processing apparatus 10 with the operation information from the user A.

An auxiliary storage device 2 is a mass storage device such as a hard disk drive (HDD) or a flash memory. This device may be either an external storage device connected with the information processing apparatus 10 typically via a universal serial bus (USB) or an internal storage device. The output device 4 may be a TV set having a display for outputting images and speakers for outputting sounds. The output device 4 may be connected by wire or wirelessly with the information processing apparatus 10.

An access point (called the AP hereunder) 8 has the functions of a wireless access point and a router. The information processing apparatus 10 connects by wire or wirelessly with the AP 8 so as to connect with an external network. A camera 7 is a stereo camera that captures images of the space around the output device 4.

Figure 2:
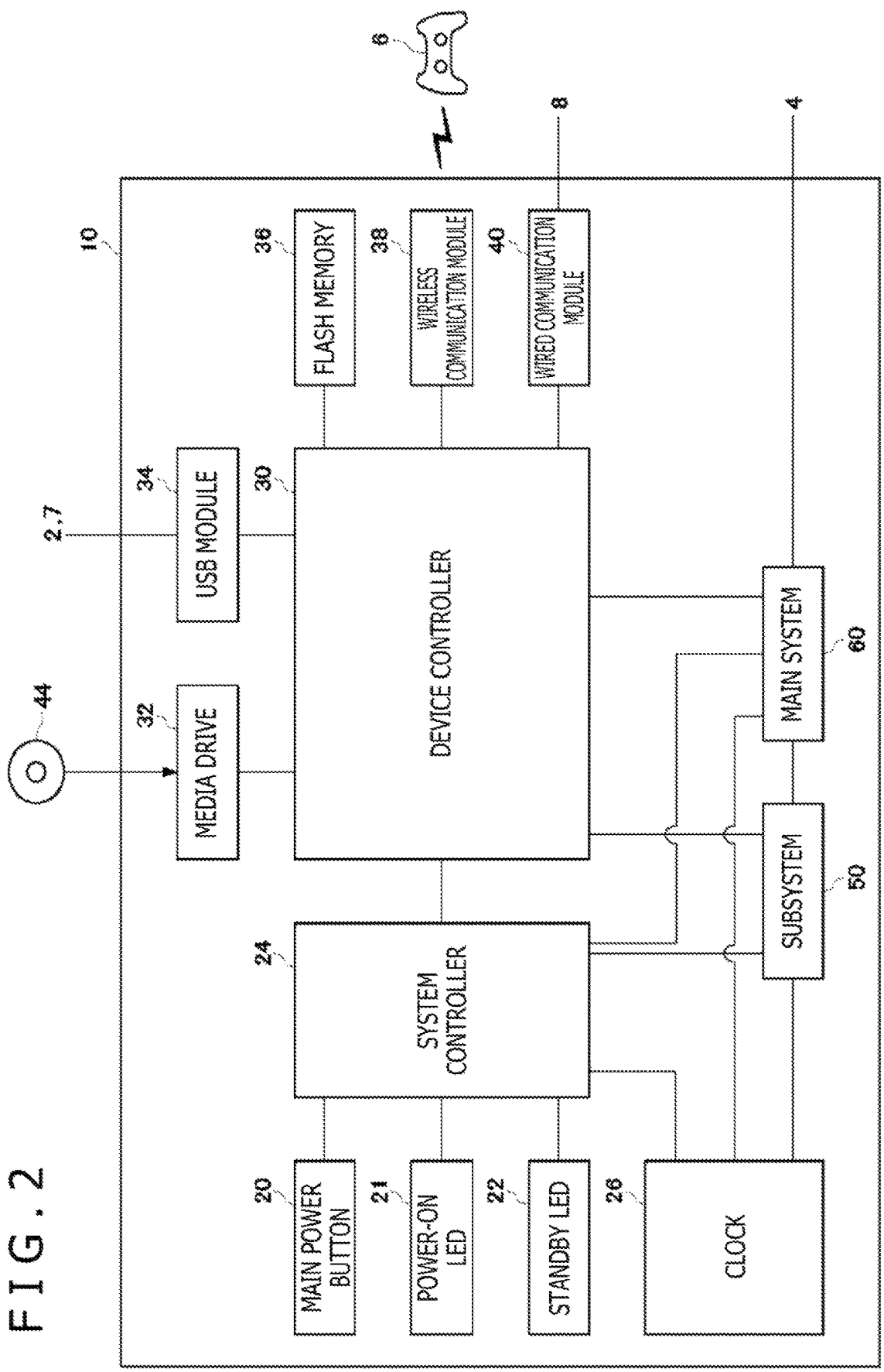
FIG. 2 is a block diagram depicting functional blocks of the information processing apparatus.

FIG. 2 is a functional block diagram of the information processing apparatus 10. The information processing apparatus 10 is configured to have a main power button 20, a power-on light-emitting diode (LED) 21, a standby LED 22, a system controller 24, a clock 26, a device controller 30, a media drive 32, a USB module 34, a flash memory 36, a wireless communication module 38, a wired communication module 40, a subsystem 50, and a main system 60.

The main system 60 includes a main central processing unit (CPU), a memory and a controller constituting a main storage device, and a graphics processing unit (GPU). The GPU is mainly used in the arithmetic processing of game programs. These functions may be configured as a system-on-chip and formed in a single chip. The main CPU has the function of executing game programs recorded in the auxiliary storage device 2 or in a ROM medium 44.

The subsystem 50 includes a sub CPU and a memory and a controller constituting a main storage device, but has neither the GPU nor the function of executing game programs. The number of circuit gates in the sub CPU is smaller than that in the main CPU. The operating power consumption of the sub CPU is lower than that of the main CPU. The sub CPU remains active while the main CPU is in a standby state. However, the sub CPU has limited processing functionality so as to minimize power consumption.

The main power button 20 is an input part on which the user performs input operations. Disposed at the front of an enclosure housing the information processing apparatus 10, the main power button 20 is operated to turn on and off the supply of power to the main system 60 of the information processing apparatus 10. The power-on LED 21 is lit when the main power button 20 is turned on. The standby LED 22 is lit when the main power button 20 is turned off.

The system controller 24 detects whether the main power button 20 is pressed by the user. With the main power supply turned off, pressing the main power button 20 causes the system controller 24 to acquire the pressing operation as an on-instruction. On the other hand, with the main power supply turned on, pressing the main power button 20 causes the system controller 24 to acquire the pressing operation as an off-instruction.

The clock 26 is a real-time clock that generates the current date and time information and feeds it to the system controller 24, subsystem 50, and main system 60. The device controller 30 is configured as a large-scale integrated circuit (LSI) that mediates, like Southbridge, transfers of information between devices. As illustrated, the device controller 30 is connected with such devices as the system controller 24, media drive 32, USB module 34, flash memory 36, wireless communication module 38, wired communication module 40, subsystem 50, and main system 60. The device controller 30 controls data transfer timing by absorbing the differences in electrical characteristics and in data transfer rates between the devices.

The media drive 32 is a drive device that drives an attached ROM medium 44 in order to read such resources as programs and data therefrom, the ROM medium 44 having application software such as games as well as license information recorded therein. The ROM medium 44 may be any one of read-only recording media such as optical disks, magneto-optical disks, and Blu-ray disks.

The USB module 34 is connected with an external device by USB cable. The USB module 34 may be connected with the auxiliary storage device 2 and camera 7 by USB cable. The flash memory 36 is an auxiliary storage device that constitutes internal storage. The wireless communication module 38 communicates wirelessly, for example, with the input device 6 according to a communication protocol such as the Bluetooth (registered trademark) protocol or IEEE 802.11 protocol. The wired communication module 40 communicates by wire with an external device in order to connect with an external network via the AP 8. The user A operating the information processing apparatus 10 may enjoy an online game with another user operating another information processing apparatus.

Figure 3:
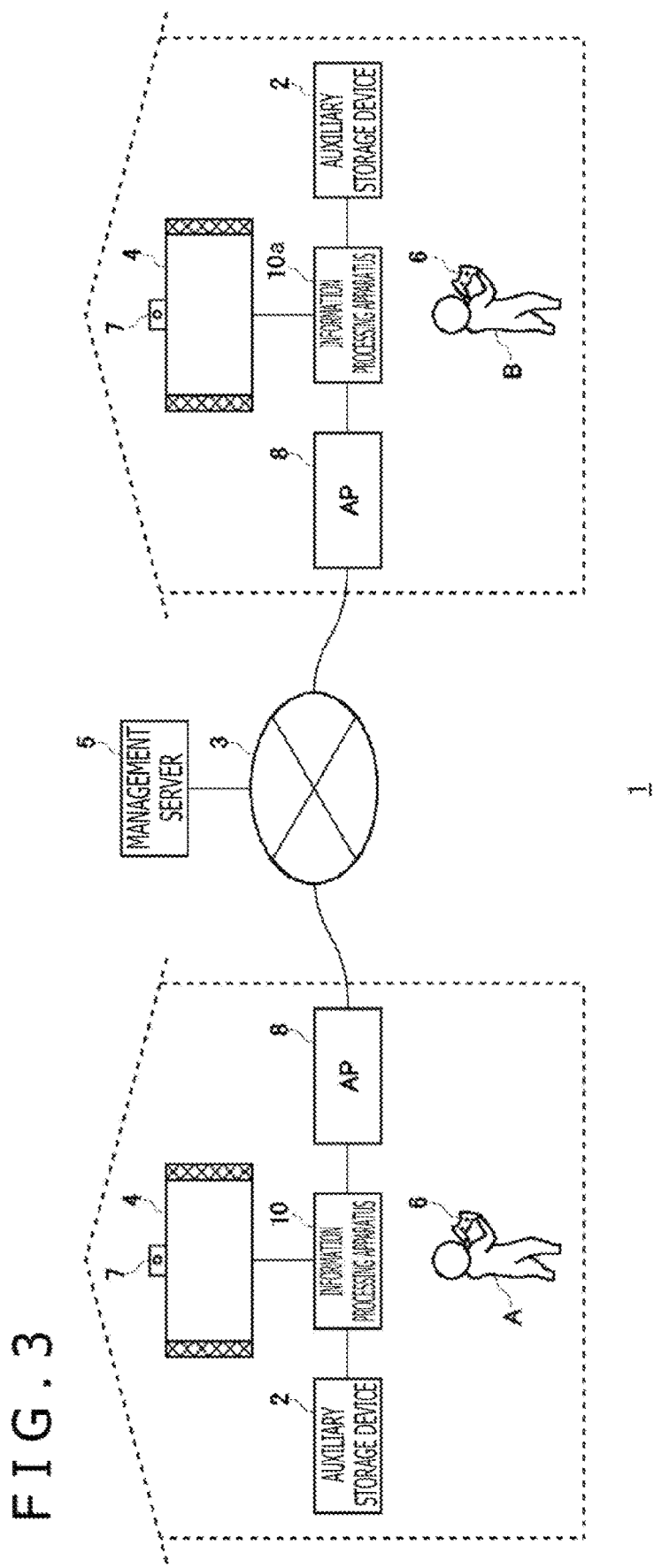
FIG. 3 is a schematic diagram depicting one mode of use of the information processing apparatus embodying the present invention.

FIG. 3 depicts one mode of use of an information processing apparatus embodying the present invention. In the information processing system 1, a management server 5 provides the user with network services for games. The management server 5 manages a network account that identifies the user. Using the network account, the user signs in to a network service provided by the management server 5.

FIG. 3 illustrates how the information processing apparatus 10 operated by the user A is connected with an information processing apparatus 10a operated by a user B via a network 3. The information processing apparatus 10 and the information processing apparatus 10a execute the same game, each apparatus transmitting to the other party the operation information regarding the input device 6 operated by the own user. The information processing apparatuses 10 and 10a cause the operation information from the users A and B to be reflected in their game progress for purpose of game progress synchronization. The users A and B can thus enjoy playing the game together.

At this point, the information processing apparatuses 10 and 10a each transmit to the other party the own user's voice input to the respective microphones (not depicted) together with the user's operation information. This allows the users A and B to have a conversation with each other while playing the game. The users can thus consult with each other typically about the game walkthrough in a coordinated play.

Figure 4:
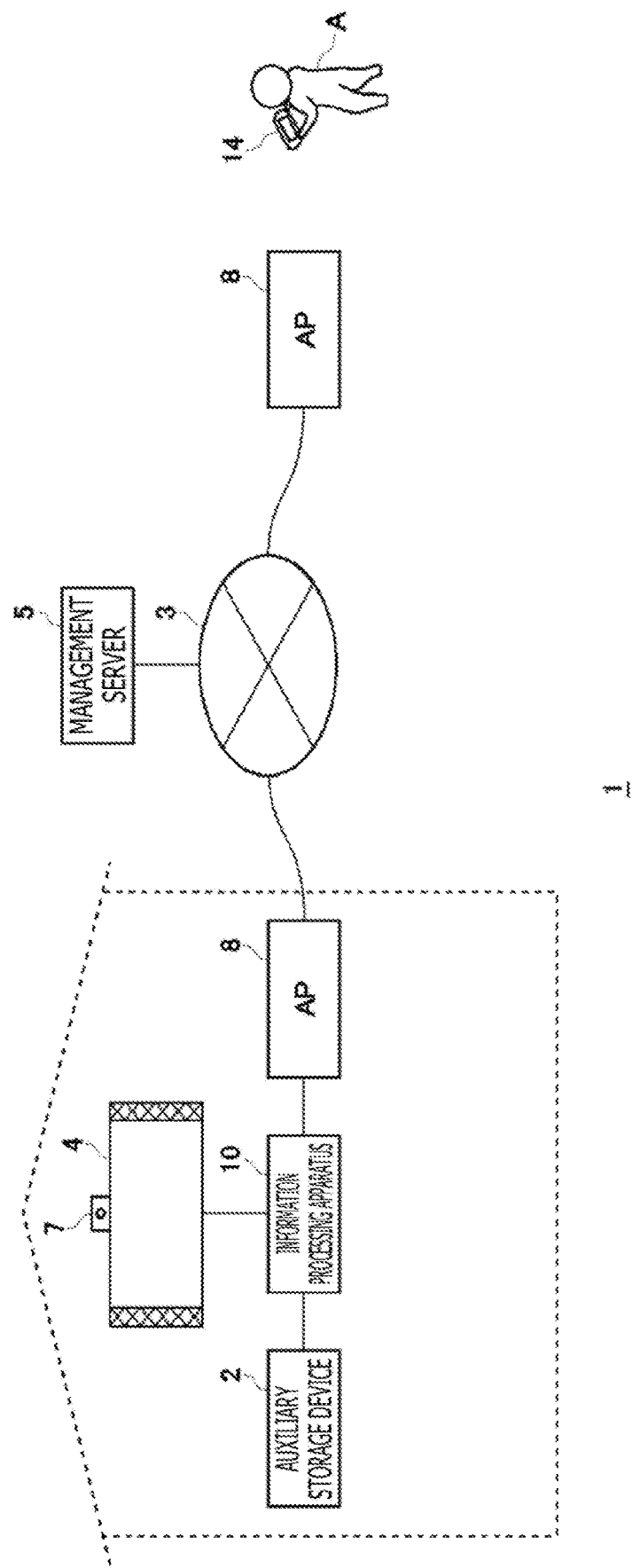
FIG. 4 is a schematic diagram depicting another mode of use of the information processing apparatus embodying the present invention.

FIG. 4 depicts another mode of use of the information processing apparatus embodying the present invention. The drawing illustrates how a terminal apparatus 14 operated by the user A connects with the information processing apparatus 10 via the network 3 to allow the user A to play the game. The mode in which the user A operates the information processing apparatus 10 from a remote location to play the game is called "remote play." In remote play, the user A is also required to sign in to the management server 5 so as to let the information processing apparatus 10 communicate with the terminal apparatus 14.

To perform remote play, the user A operates the terminal apparatus 14 to transmit a connection request to the information processing apparatus 10. If the main power supply of the information processing apparatus 10 remains off at this point, the main system 60 is activated in accordance with the connection request. The main system 60 generates menu image data representing an array of game icons and transmits the generated data to the terminal apparatus 14. In turn, the terminal apparatus 14 displays a menu screen on a display device. When the user A selects a desired game icon on the menu screen, the terminal apparatus 14 transmits the operation information regarding the selection to the information processing apparatus 10. The information processing apparatus 10 starts the selected game, generates game image data, and transmits the generated data to the terminal apparatus 14. In turn, the terminal apparatus 14 displays a game start screen on the display device.

In remote play, the information processing apparatus 10 accepts as input to the game the operation information input to the terminal apparatus 14 by the user A. Also, the information processing apparatus 10 transmits to the terminal apparatus 14 the output data being sent to the output device 4. This enables the terminal apparatus 14 to display on the display device the game image reflecting the operations of the user A. The terminal apparatus 14 may be an information processing apparatus such as a portable game device, a smartphone, or a tablet. The terminal apparatus 14 may alternatively be a personal computer. The terminal apparatus 14 is connected with the information processing apparatus 10 on a peer-to-peer basis.

Figure 5:
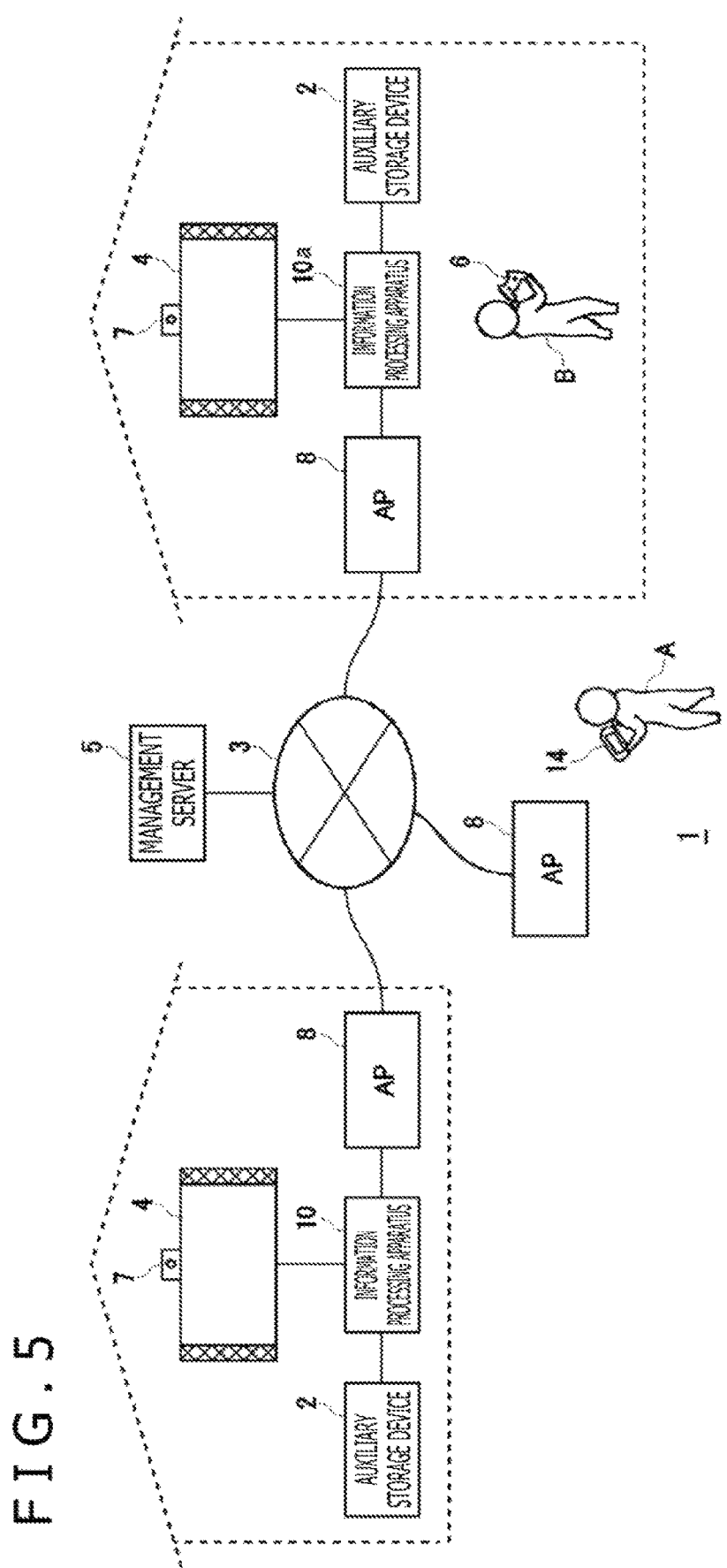
FIG. 5 is a schematic diagram depicting still another mode of use of the information processing apparatus embodying the present invention.

FIG. 5 depicts still another mode of use of the information processing apparatus embodying the present invention. The drawing illustrates a mixture of the mode of use in FIG. 3 and the mode of use in FIG. 4, picturing how the user A in a location away from the information processing apparatus 10 plays the game with the user B in remote play. In the mode of play depicted in FIG. 5, the user A operates the information processing apparatus 10 remotely from the terminal apparatus 14 so as to connect the information processing apparatus 10 with the information processing apparatus 10a via the network 3. The connection allows the users A and B to play the game together.

Figure 6:
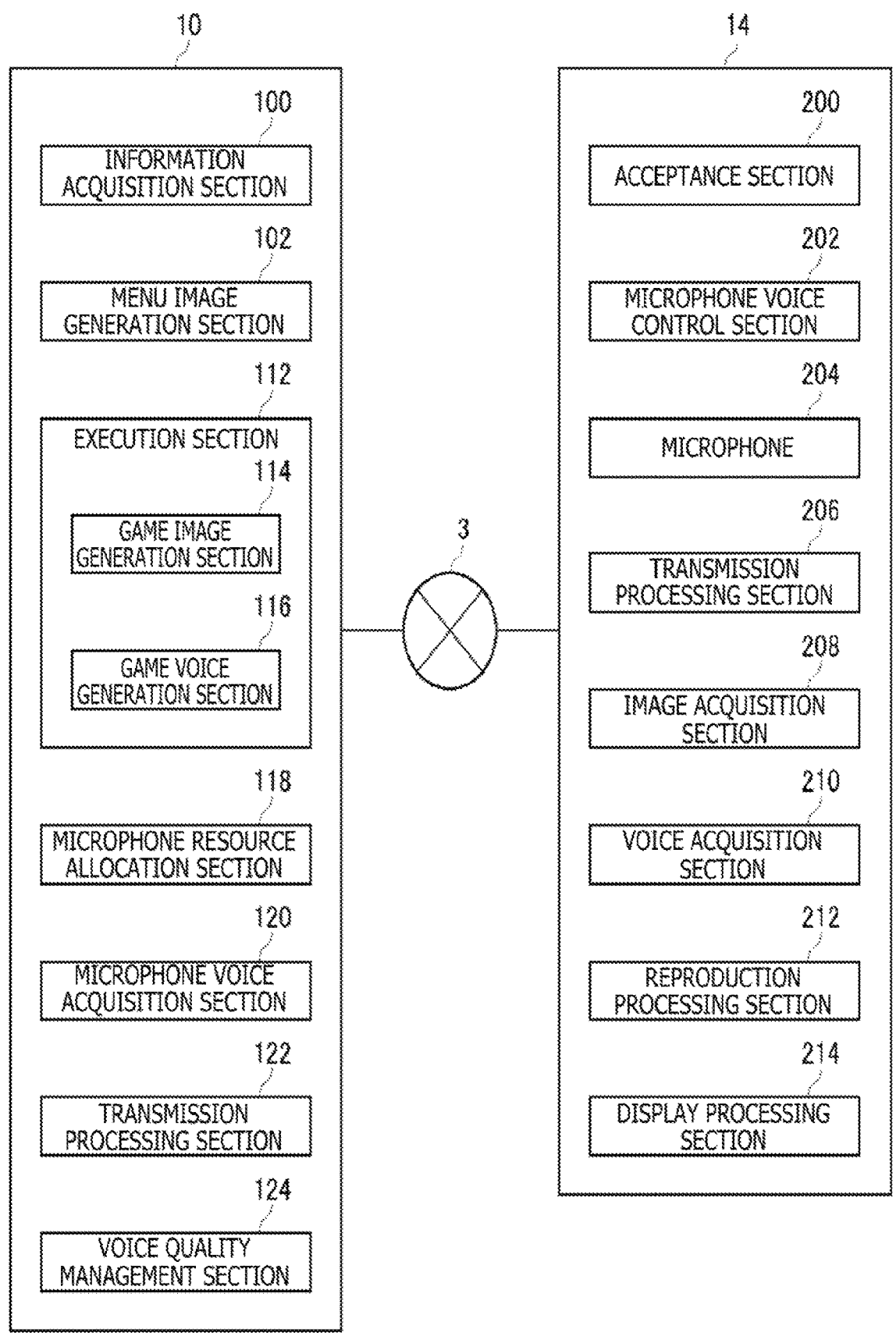
FIG. 6 is a schematic diagram depicting configurations of the information processing apparatus and a terminal apparatus.

FIG. 6 depicts configurations of the information processing apparatus 10 and the terminal apparatus 14. The information processing apparatus 10 includes an information acquisition section 100, a menu image generation section 102, an execution section 112, a microphone resource allocation section 118, a microphone voice acquisition section 120, and a transmission processing section 122. The terminal apparatus 14 includes an acceptance section 200, a microphone voice control section 202, a microphone 204, a transmission processing section 206, an image acquisition section 208, a voice acquisition section 210, a reproduction processing section 212, and a display processing section 214.

The components noted in FIG. 6 as the functional blocks for performing diverse processes may be configured by hardware in the form of circuit blocks, memories, and other LSI, for example, or by software using typically programs loaded into a memory. It will thus be appreciated by those skilled in the art that these functional blocks are configured by hardware only, by software only, or by a combination thereof in diverse forms and are not limited to any one of such forms.

The user A operates the terminal apparatus 14 to transmit to the information processing apparatus 10 a connection request for remote play. Once a connection is established between the terminal apparatus 14 and the information processing apparatus 10 for remote play, the menu image generation section 102 generates menu image data representing an array of game icons. The transmission processing section 122 transmits the menu image data to the terminal apparatus 14.

Figure 7:
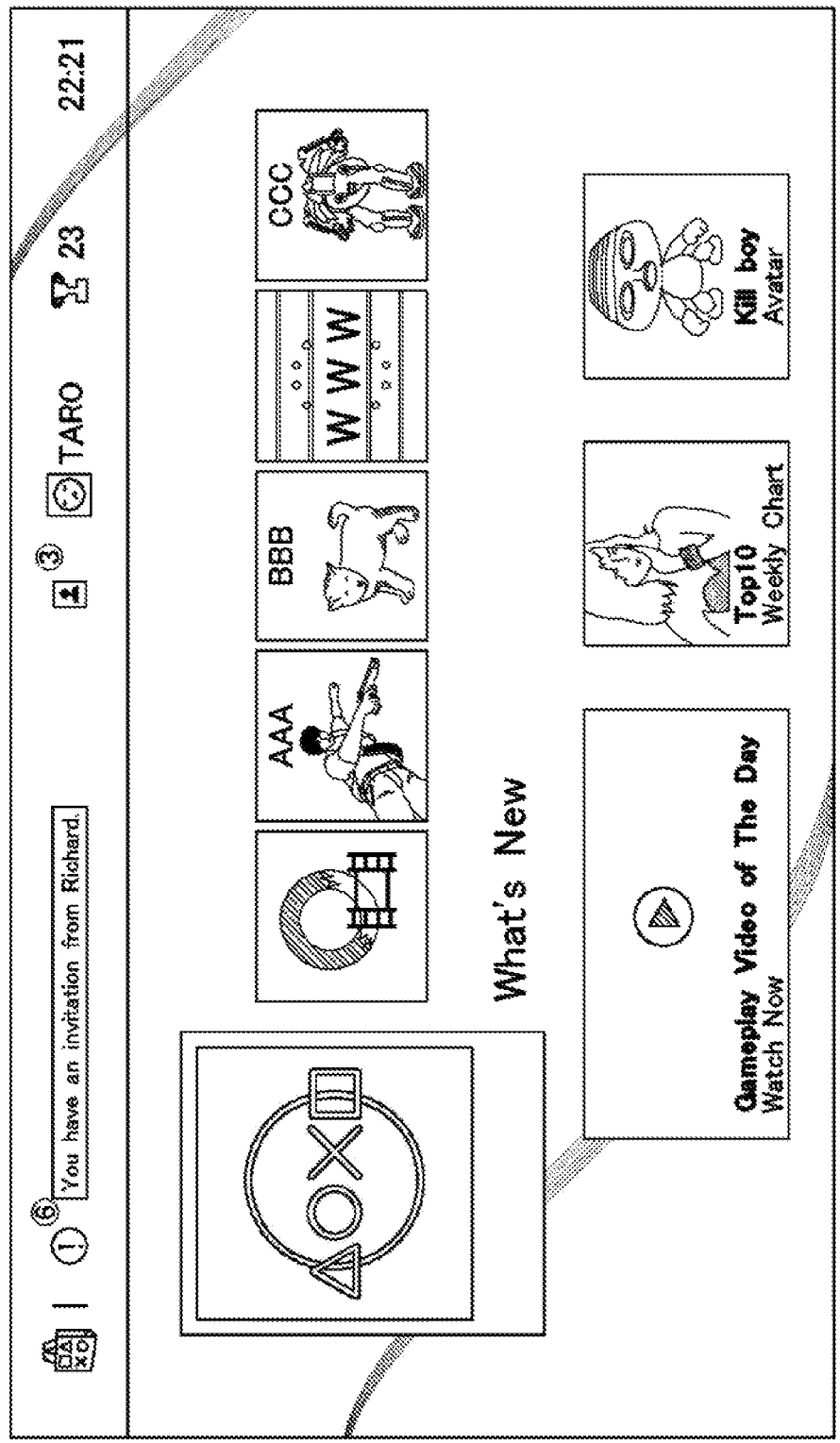
FIG. 7 is a schematic diagram depicting a typical menu screen.

FIG. 7 depicts a typical menu screen displayed on the display device of the terminal apparatus 14. The image acquisition section 208 acquires the menu image data transmitted from the information processing apparatus 10. The reproduction processing section 212 displays the menu screen on the display device. The display device of the terminal apparatus 14 is configured as a touch screen. When the user A selects a desired game icon on the menu screen, the acceptance section 200 accepts information regarding the selection. The transmission processing section 206 transmits the selection information to the information processing apparatus 10. When the information acquisition section 100 in the information processing apparatus 10 accepts the transmitted selection information, the execution section 112 executes the selected game. At this point, a game image generation section 114 generates game image data while a game voice generation section 116 generates game voice data. The transmission processing section 122 transmits the game image data and the game voice data to the terminal apparatus 14.

In the terminal apparatus 14, the acceptance section 200 accepts the operation information regarding the game played by the user A. For example, the user A may either connect the input device 6 with the terminal apparatus 14 to input the operation information, or operate a GUI imitating the input device 6 on the touch screen of the input terminal 14 for operation information input. The transmission processing section 206 transmits the operation information from the user A to the information processing apparatus 10. In the information processing apparatus 10, the execution section 112 causes the operation information to be reflected in the game progress. The game image generation section 114 and the game voice generation section 116 generate respectively the game image data and the game voice data reflecting the operation information. The transmission processing section 122 transmits the game image data and the game voice data to the terminal apparatus 14.

In the terminal apparatus 14, the image acquisition section 208 acquires the game image data reflecting the operation information while the voice acquisition section 210 acquires the game voice data reflecting the operation information. The reproduction processing section 212 reproduces the game image data through the display device and the game voice data through speakers. Thus in remote play, the user A in a location away from the information processing apparatus 10 may use the terminal apparatus 14 to operate the information processing apparatus 10.

With the embodiment, especially in the mode of use depicted in FIG. 5, the user A in remote play may desire to convey his or her voice to the user B via the terminal apparatus 14. To address the desire, the terminal apparatus 14 incorporates the function of transmitting the voice signal output from the microphone 204 to the information processing apparatus 10. Specifically in the terminal apparatus 14, the microphone voice control section 202 controls whether or not to transmit the voice signal from the microphone 204 to the information processing apparatus 10 in accordance with the operation of the user A. The microphone 204 may be either a built-in microphone or an external microphone attached to the terminal apparatus 14.

The display processing section 214 displays a microphone icon indicating the status of the microphone 204. On the menu screen depicted in FIG. 7, for example, the user A may tap the screen space other than the displayed icons. This causes the display processing section 214 to display a tool bar at the bottom of the screen. The display processing section 214 displays on the tool bar a microphone icon indicating the status of the microphone 204. The microphone icon is displayed in such a manner that it can be tapped for operation by the user.

Figure 8:
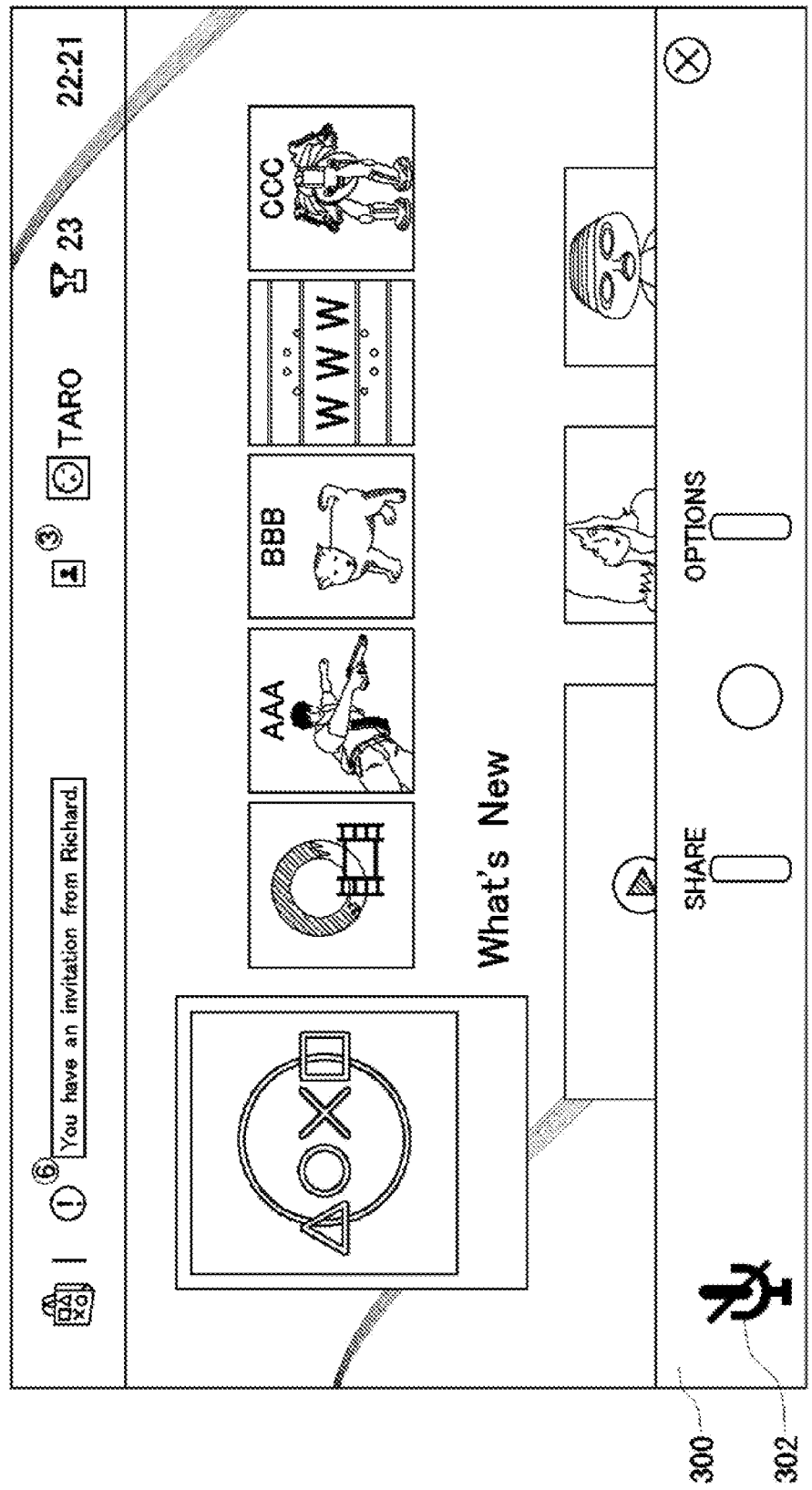
FIG. 8 is a schematic diagram depicting a tool bar superimposed on the menu screen.

FIG. 8 depicts a tool bar superimposed on the menu screen. A tool bar 300 indicates various icons including a microphone icon 302. These icons are displayed in such a manner that each of them can be tapped for operation. FIG. 9 depicts display examples of microphone icons. FIG. 9(a) depicts a microphone icon indicating a mute release state. The mute release state of the microphone 204 is a state in which the voice signal converted by the microphone 204 can be used.

FIG. 9(b) depicts a microphone icon indicating a mute state of the microphone 204. The mute state of the microphone 204 is a state in which a voice conversion function of the microphone 204 is stopped or in which the voice signal converted by the microphone cannot be used. FIG. 9(c) depicts an animated microphone icon indicating that the microphone 204 is receiving input of at least a predetermined level of sound volume. FIG. 9(c) gives a special effect display of a microphone icon which indicates the mute release state and which is supplemented with an animation that varies with sound volume.

The user can verify the status of the microphone icon 302 by checking it on the tool bar 300.

As depicted in FIG. 8, the microphone 204 is in a mute state immediately after the start of remote play. When the microphone icon indicating the mute state is tapped, the microphone voice control section 202 causes the transmission processing section 206 to transmit to the information processing apparatus 10 notification information indicating that the voice signal of the microphone 204 is to be transmitted to the information processing apparatus 10. When the information acquisition section 100 in the information processing apparatus 10 acquires the notification information, the information acquisition section 100 forwards the acquired notification information to the microphone resource allocation section 118. In turn, the microphone resource allocation section 118 performs the process of virtually allocating the microphone 204 of the terminal apparatus 14 to a microphone resource possessed by the information processing apparatus 10.

The information processing apparatus 10 possesses multiple microphone voice acquisition sections 120 as its microphone resources that receive voice signals from microphones by wire or wirelessly. Upon receipt of the notification information, the microphone resource allocation section 118 allocates one microphone resource (microphone voice acquisition section 120) to the microphone 204. When allocated to the microphone 204, the microphone voice acquisition section 120 is enabled to acquire the voice signal of the microphone 204 transmitted from the terminal apparatus 14. Once the microphone resource allocation section 118 allocates the microphone voice acquisition section 120 to the microphone 204, the allocation is not released until remote play is terminated. Thus after transmitting the notification information once to the information processing apparatus 10 via the transmission processing section 206, the microphone voice control section 202 prevents the transmission processing section 206 from sending the notification information again to the information processing apparatus 10 from that point on even if the microphone icon indicating the mute state of the microphone 204 is again operated. That is, during remote play, the microphone voice control section 202 transmits the notification information only once to the information processing apparatus 10.

When the microphone icon indicating the mute state of the microphone 204 (see FIG. 9(b)) is tapped, the display processing section 214 displays the microphone icon indicating the mute release state of the microphone 204 (see FIG. 9(a)). When the microphone indicating the mute release state of the microphone 204 (see FIG. 9(a)) is tapped, the display processing section 214 displays the microphone icon indicating the mute state of the microphone 204 (see FIG. 9(b)). In this manner, the display processing section 214 switches the mode of display of the microphone icon 302 in keeping with the user's operations on the microphone icon 302.

The mode of display of the microphone icon 302 is switched by the display processing section 214 under voice signal transmission control of the microphone voice control section 202. That is, when the microphone icon indicating the mute state of the microphone 204 (see FIG. 9(b)) is tapped, the microphone voice control section 202 causes the transmission processing section 206 to transmit the voice signal of the microphone 204 to the information processing apparatus 10. When the microphone indicating the mute release state of the microphone 204 (see FIG. 9(a)) is tapped, the microphone voice control section 202 causes the transmission processing section 206 to stop transmitting the voice signal of the microphone 204. In this manner, the microphone voice control section 202 controls whether or not to transmit the microphone voice signal in accordance with the user's operations on the microphone icon 302.

For example, when the user A plays the game alone in the mode of use depicted in FIG. 4, there is little need to transmit the voice signal of the microphone 204 to the information processing apparatus 10. However, when the user A plays the game together with the user B, it is preferred that the voice signal of the microphone 204 be transmitted to the information processing apparatus 10 that in turn will transfer the signal to the information processing apparatus 10a. Thus the user A verifies the status of the microphone 204 by checking the mode of display of the microphone icon 302 and, as needed, taps the microphone icon 302 to determine whether or not to transmit the microphone voice signal.

In the information processing apparatus 10, the microphone voice acquisition section 120 acquires the voice signal of the microphone 204. In the case where the user A is in voice chat with the user B, the transmission processing section 122 transmits the voice signal of the microphone 204 to the information processing apparatus 10a of the user B. Also, when the information acquisition section 100 acquires the microphone voice signal from the information processing apparatus 10a, the transmission processing section 122 transmits the microphone voice signal of the user B to the terminal apparatus 14. This allows the user A and user B to play the game together while having a conversation.

A voice quality management section 124 manages the voice quality of voice data transmitted between the information processing apparatus 10 and the terminal apparatus 14. In the information processing system 1, multiple kinds of voice data can be transmitted simultaneously between the information processing apparatus 10 and the terminal apparatus 14. The voice quality management section 124 manages the voice quality of each kind of voice data by suitably setting a voice encoding format and a bit rate, for example.

An example of the voice data transmitted between the information processing apparatus 10 and the terminal apparatus 14 is game voice data that is generated by the game voice generation section 116 in remote play and transmitted by the transmission processing section 122 to the terminal apparatus 14. A second example of the voice data is chat voice data transmitted between the information processing apparatus 10 and the terminal apparatus 14 when voice chat is conducted therebetween. A third example of the voice data is, as explained above in connection with the embodiment, microphone voice data that is input to the microphone 204 of the terminal apparatus 14 and transmitted to the information processing apparatus 10 via the transmission processing section 206.

In the case where multiple kinds of voice data are transmitted simultaneously between the information processing apparatus 10 and the terminal apparatus 14, the voice quality management section 124 sets the voice quality for each kind of voice data. Voice quality is determined by a combination of the voice encoding format and the bit rate, for example. Given the multiple kinds of voice data, the voice quality management section 124 may set the voice quality of the game voice data to a maximum level. The voice quality management section 124 may set the voice quality of the game voice data to the highest level while setting the voice quality of other voice data such as the chat voice data and the microphone voice data to lower levels. The voice quality management section 124 may alternatively set the voice quality level of the chat voice data and that of the microphone voice data in a manner adaptive to the communication environment.

The voice quality management section 124 may hold priorities of multiple kinds of voice data that can be transmitted between the information processing apparatus 10 and the terminal apparatus 14 in order to maximize voice quality. For example, in the case where the game voice data, chat voice data, and microphone voice data are prioritized in that order, the voice quality management section 124 may set the voice quality of the game voice data to the highest level followed by a lower voice quality level of the chat voice data and a still lower voice quality level the microphone voice data. For example, with the game voice data and the microphone voice data being transmitted between the information processing apparatus 10 and the terminal apparatus 14, if a voice chat application is executed anew and the chat voice data starts to be transmitted, the voice quality management section 124 may change the voice quality of the microphone voice data to a lower level so as to let the voice quality of the microphone voice quality be set using desired voice parameters.

The present invention has been described above in conjunction with a specific embodiment. It is to be understood by those skilled in the art that suitable combinations of the constituent elements and various processes of the embodiment described above as an example will lead to further variations of the present invention and that such variations also fall within the scope of this invention. For example, whereas it was explained above in reference to FIG. 5 that the user A performs remote play, the user B may alternatively perform remote play in place of the user A.

In another example, if the microphone 204 of the terminal apparatus 14 becomes unusable during remote play, the tool bar 300 may display a microphone icon 302 indicating that the microphone 204 is currently not usable.

REFERENCE SIGNS LIST

1 Information processing system
10, 10a Information processing apparatus
14 Terminal apparatus
100 Information acquisition section
102 Menu image generation section
112 Execution section
114 Game image generation section
116 Game voice generation section
118 Microphone resource allocation section
120 Microphone voice acquisition section
122 Transmission processing section
200 Acceptance section
202 Microphone voice control section
204 Microphone
206 Transmission processing section
208 Image acquisition section
210 Voice acquisition section
212 Reproduction processing section
214 Display processing section
216 Voice quality management section

INDUSTRIAL APPLICABILITY

The present invention may be applied to the techniques for executing games.

The invention claimed is:

1. A terminal apparatus to be operated by a user, the terminal apparatus comprising:
   a transmission processing section configured to transmit information regarding an operation performed by the user to an information processing apparatus;
   an acquisition section configured to acquire image data and voice data of a game that reflects the operation information from the information processing apparatus;
   a reproduction processing section configured to reproduce the acquired game image data and game voice data; and
   a microphone voice control section configured to control whether or not to transmit a voice signal of a microphone to the information processing apparatus.

2. The terminal apparatus according to claim 1, wherein the microphone voice control section causes the transmission processing section to transmit notification information indicating that the microphone voice signal is to be transmitted to the information processing apparatus.

3. The terminal apparatus according to claim 2, further comprising:
   a display processing section configured to display a microphone icon indicating status of the microphone; wherein
   when the microphone icon indicating a mute state of the microphone is operated, the microphone voice control section causes the transmission processing section to transmit the notification information to the information processing apparatus.

4. The terminal apparatus according to claim 3, wherein when the microphone icon indicating the mute state of the microphone is operated, the display processing section displays the microphone icon indicating a mute release state of the microphone, and
   when the microphone icon indicating the mute release state of the microphone is operated, the display processing section displays the microphone icon indicating the mute state of the microphone.

5. The terminal apparatus according to claim 4, wherein, when the microphone icon indicating the mute state of the microphone is operated, the microphone voice control section causes the transmission processing section to transmit the microphone voice signal to the information processing apparatus, and
   when the microphone icon indicating the mute release state of the microphone is operated, the microphone voice control section causes the transmission processing section to stop transmitting the microphone voice signal.

6. The terminal apparatus according to claim 3, wherein the microphone voice control section causes the transmission processing section to transmit the notification information once to the information processing apparatus when the microphone icon indicating the mute state of the microphone is operated, the microphone voice control section thereafter preventing the information processing apparatus from transmitting the notification information again even if the microphone icon indicating the mute state of the microphone is again operated.

7. An information processing apparatus comprising:
an execution section configured to generate image data and voice data of a game that reflects information regarding an operation performed by a user, the operation information being transmitted from a terminal apparatus;
a transmission processing section configured to transmit the game image data and the game voice data to the terminal apparatus;
a microphone voice acquisition section; and
a microphone resource allocation section configured to allocate the microphone voice acquisition section to a microphone of the terminal apparatus.

8. A microphone voice transmission method comprising:
transmitting information regarding an operation performed by a user to an information processing apparatus that executes a game;
acquiring image data and voice data of the game that reflects the operation information from the information processing apparatus;
reproducing the acquired game image data and game voice data; and
controlling whether or not to transmit a voice signal of a microphone to the information processing apparatus.

9. A program for a computer, comprising:
by a transmission processing section, transmitting information regarding an operation performed by a user to an information processing apparatus that executes a game;
by an acquisition section, acquiring image data and voice data of the game that reflects the operation information from the information processing apparatus;
by a reproduction processing section, reproducing the acquired game image data and game voice data; and
by a microphone voice control section, controlling whether or not to transmit a voice signal of a microphone to the information processing apparatus.

* * * * *